United States Patent [19]

Cool et al.

[11] Patent Number: 4,627,004
[45] Date of Patent: Dec. 2, 1986

[54] COLOR IMAGE RECORDING SYSTEM AND METHOD FOR COMPUTER-GENERATED DISPLAYS

[75] Inventors: John K. Cool, Thousand Oaks; Edmund G. Newbert, Jr., Newbury Park; Charles A. Glorioso, Thousand Oaks, all of Calif.

[73] Assignee: Image Resource Corporation, Westlake Village, Calif.

[21] Appl. No.: 433,842

[22] Filed: Oct. 12, 1982

[51] Int. Cl.$^4$ .................. H04N 9/81; G06F 15/62
[52] U.S. Cl. ................................. 364/521; 358/32; 358/334
[58] Field of Search ............ 340/703, 720, 721; 354/7; 355/20, 40, 35; 358/32, 333, 334; 364/518, 521, 523, 525, 526

[56] References Cited

U.S. PATENT DOCUMENTS

| | | | |
|---|---|---|---|
| 2,921,498 | 1/1960 | Simmon et al. | 364/525 X |
| 3,752,906 | 8/1973 | Lowry | 358/334 X |
| 3,772,465 | 11/1973 | Vlahos et al. | 355/40 X |
| 4,017,891 | 4/1977 | Helmberger et al. | 358/334 X |
| 4,208,672 | 6/1980 | Ameen et al. | 358/332 X |
| 4,373,156 | 2/1983 | Pfannkuch et al. | 340/703 |
| 4,438,453 | 3/1984 | Alston | 358/75 X |
| 4,454,593 | 6/1984 | Fleming et al. | 364/521 X |
| 4,473,849 | 9/1984 | Cool | 358/32 X |
| 4,488,244 | 12/1984 | Freeman | 364/521 X |
| 4,536,848 | 8/1985 | d'Entremont et al. | 358/332 X |

OTHER PUBLICATIONS

*IBM Personal Computer Technical Reference*, pp. 2-45 to 2-63 (1981).

"Microprocessor-Controlled System Prints Color TV Pictures", by L. Levinson and E. Newbert: *Electronics Magazine*, Sep. 22, 1981, pp. 121-125.

*Primary Examiner*—Felix D. Gruber
*Assistant Examiner*—Edward R. Cosimano
*Attorney, Agent, or Firm*—Fraser and Bogucki

[57] ABSTRACT

A high spatial and dynamic resolution color image recording system and method for computer generated displays includes a low cost personal computer having a low resolution display monitor adapter and a photographic image recorder coupled to receive low resolution fields of a video image in intensity dependent time varying steps to produce a high resolution composite image. Spatial resolution is improved by providing a separate image for each primary color component as a plurality of interlaced fields. High dynamic resolution is attached for each field by generating each field on a single intensity monochrome raster scan display and exposing the image of a field through a primary color filter in a plurality of intensity dependent steps with the total exposure time for each different color intensity being proportional to the intensity thereof. A gamma compensation is utilized to compensate for the particular optical characteristics of the display, filter and photographic film.

15 Claims, 4 Drawing Figures

FIG.1

FIG. 2
IMAGE RECORDER FLOW CHART

FIG.4

COLOR IMAGE RECORDING SYSTEM AND METHOD FOR COMPUTER-GENERATED DISPLAYS

BACKGROUND OF THE INVENTION

1. Field of the Invention

This invention relates to hard copy computer display image recording systems and methods and more particularly to a system and method of photographically recording full color video images having spatial and dynamic resolutions far superior to the capabilities of an inexpensive personal computer generating the display.

2. Discussion of the Prior Art

Many small data processing systems are now in widespread use because of their low cost and versatility, and many of these are utilized for generating color displays, in conjunction with which it is often desired to make a hard copy on a transparency or on a positive or negative print. While a relatively small, personal computer, has the data processing power to generate an image of high resolution (say 1000×1000) picture elements for a 10"×10" display it is not economical to use a high cost, high resolution display tube or other device. Instead, the extremely widely used personal computers employ relatively low cost raster scan TV-type. systems, It is necessary to provide color data for three colors concurrently in order to drive the raster scan device in conventional fashion, with three color beams writing concurrently. In order to do this, a display buffer is typically used to store data defining a video image and the data can be read out in raster scan order so as to cause the generation of the image on a color display device. The usual method of making a hard copy is simply to photograph the picture tube of the display device, although impact printers are available which employ different ribbons and require substantial time to provide a printed image. One example of a hard copy photographic recording system is disclosed in application Ser. No. 333,120 filed Dec. 21, 1981 by John K. Cool for "System And Apparatus For Conversion Of Video Signals To Film Images," now U.S. Pat. No. 4,473,849.

It can be seen that the size of the display buffer controls the resolution of the resultant hard copy image. The IBM personal computer provides a good example of this situation. While in conjunction with the CPU of the IBM personal computer an image defined by a large dynamic range of each of three primary colors can be constructed of higher than typically desired resolution, limits on both the spatial and dynamic resolution of the display are imposed by the 16 kilobyte display buffer, which can hold (for 1 bit of monochrome intensity resolution per pixel) an image consisting of 200 vertically positioned horizontal lines having 640 picture elements each. For a color display, a maximum spatial resolution is 320×200 with a 2 bit dynamic resolution selecting one of four predetermined colors.

There are numerous applications, however, in which higher resolution color images are desired as evidenced by the commercial success of various systems for generating transparencies and other hard copy for the display of business and commercial data. These systems, however, cost in the tens of thousands of dollars, and require a high rate of use which is incompatible with the important but occasional employment of a personal computer to generate a high resolution image. It is not, on the other hand, feasible to modify the personal computer, which is a standardized and mass produced system. The display portion of one particular personal computer is described in the *IBM Personal Computer Technical Reference*, pp. 2–45 to 2–63 (1981).

SUMMARY OF THE INVENTION

Systems and methods in accordance with the invention provide a high dynamic and spatial resolution color display from a low cost, personal computer by rearranging a selected high resolution color image into separate spatially distinct fields representing spatially mutually exclusive portions of the image which are assembled in a plurality of color intensity dependent steps and which do not exceed display buffer capacity. The memory characteristics of the recording medium are utilized to recreate the high resolution frames from suitably displaced individual vertically interlaced fields with controlled exposure times.

In a more specific example of systems in accordance with the invention, a computer generates a high resolution color image defined by data indicating color intensity for each of three primary colors. Display data representing at least two types of spatially mutually exclusive image fields (e.g. even field and odd field) are assembled in sequence in a display buffer to be output to an image recorder in raster scan order. The assembly of display data for each field is further divided into a plurality of steps with a set of color intensity dependent display data being assembled, stored and output at each step. As display data for each field of a color component is made available by a display buffer as a portion of a single color display, a corresponding black and white image is generated, and presented through an appropriate color filter to the color recording medium by a raster scanning display device. Display data defining an image portions of for a given field is presented repeatedly to the display in intensity dependent steps, greatest intensity first, and repeatedly exposed until a separately computed exposure time is reached for each different intensity in the color field. Then the image for the next spatially separated field for that color is displayed, displaced slightly so as to interlace with the image of the first field, and successive step images are similarly displayed, in time varied, intensity dependent steps, with the established increment of spacing. When full recording in one color has been effected, the system repeats the process with stepped image data for each of the two remaining colors. Consequently, a color image having a spatial resolution of 640×400 and 256 or more shades of intensity for each of three primary colors may be generated without modifying the personal computer. Furthermore, the system is not limited to the color palette provided by the computer, but by superimposition of colors can achieve any unique color mixing within the tremendous dynamic resolution of the system.

BRIEF DESCRIPTION OF THE DRAWINGS

A better understanding of the invention may be had from a consideration of the following detailed description taken in conjunction with the accompanying drawings, in which.

DETAILED DESCRIPTION OF THE INVENTION

Figure 1:
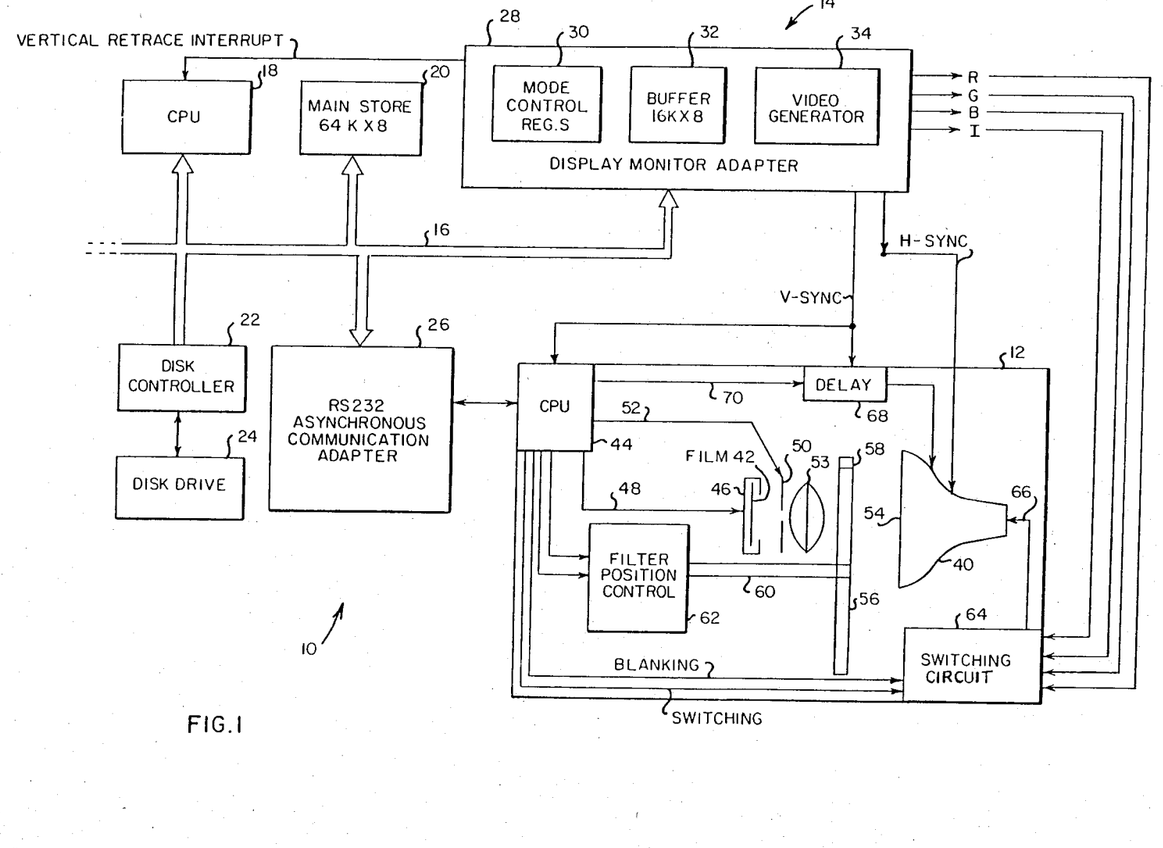
FIG. 1 is a block diagram and schematic representation of a high spatial and dynamic resolution image recording system in accordance with the invention.

Referring now to FIG. 1, a high spatial and dynamic resolution display and recording system 10 in accordance with the invention includes an image recording system 12 and an information processing system 14. The information processing system may be implemented as a small, low cost computer system having a relatively low resolution display information generating system such as the personal computer manufactured by International Business Machines Corporation.

The information processing system 14 includes a system bus 16 interconnecting a central processing unit 18, 64K words x 8 bits or more of main storage 20, a disk controller 22 coupled to control communication with one or more disk drives 24, an RS 232 asynchronous communication adapter 26 providing serial communication between the image recording system 12 and the system bus 16, and a display monitor adapter 28.

The display monitor adapter 28 includes a set of mode control registers 30, a 16K×8 display data buffer, 32 and a video generator 34. The video generator 34 operates in a non-interlaced mode to access, the 16K buffer 32 and output data representing a video image stored in buffer 32 at a frame rate of 60 frames per second. In other words, a full current step image stored in buffer 32 (which is typically only a portion of a final photographic image) is repetitively output by video generator 34 at a rate of 60 step image scans per second. A plurality of step images are typically required to generate a final photographic image. The red, green and blue 25 primary color data is output on signal lines R, G and B respectively while a 1 bit intensity control signal is output on signal I to permit a video monitor to selectively increase the brightness of the color signal output on signal paths R, G, B and thereby double the number of color shades which are available to the display system. The video generator also outputs conventional vertical and horizontal synchronization signals V-sync and H-sync which define the phase and timing of lines and frames of output display data.

Although a number of operating modes are available in the IBM personal computer system, only the screen 2 mode is of interest in the present application. In this mode the buffer 32 stores 1 frame of display data with a resolution of 640 bits per line by 200 lines. Each pixel of data is represented by a single bit within buffer 32 to provide a single intensity monochrome display. That is, each pixel of an image is defined as either white or black, depending upon the state of the data bit corresponding thereto. In the screen 2 mode of operation, the pixel data is output simultaneously in parallel on signals R, G and B and signal I is not used.

The image recording system 12 receives the video data signals from video generator 34, displays them as a video image on a raster scan cathode ray tube 40, and records the displayed image on a section of photographic film 42 which may be part of a roll of film containing many sections. A recorder central processing unit 44 receives serial control data from main CPU 18 through the asynchronous communication adapter 26. The information received from CPU 18 includes mode control data as well as information defining color shade or intensity associated with images which are being displayed upon the CRT 40. CPU 44 further receives the vertical synchronization signal V-sync from the video generator portion 34 of display monitor adapter 28 to serve as a synchronization and timing signal for recorder CPU 44. The synchronization of recorder CPU 44 with the vertical sync signal V-sync enables the recorder CPU 44 to execute control functions during a vertical retrace blanking interval and avoid making any changes in the recorder 12 operating mode during a raster scan image display interval. Signal V-sync also enables CPU 44 to count frames (step image scans) and thereby control the exposure of film 42 to a given image for a selected number of frames (step image scans) and thereby control the shade or brightness within which a particular image is recorded upon film 42 for a given color.

A film support and advancing mechanism 46 is connected for control by a film advance signal 48 generated by the recorder CPU 44 at the conclusion of the recording of a complete image. A mechanical shutter 50 is connected for control in response to a mechanical shutter signal 52 which is generated by recorder CPU 44 to open mechanical shutter 50 at the start of a period for recording an image on a section of the film 42 and to close shutter 50 when the complete composite image has been recorded upon film 42. A lens 53 provides proper focusing of an image generated on a screen 54 on the face of CRT 40 for proper recording on the section of film 42. A filter wheel 56 has at least three primary color filter sections 58 which are selectively interposed between the recording film section 42 and the displayed image on the face 54 of CRT 40. In the present example the filter sections 58 include a red section, a green section, a blue section, and a transparent section which is useful for testing purposes. The filter wheel 56 is coupled by a shaft 60 to a filter position control 62 which supports shaft 60 and selectively rotates shaft 60 in response to filter color commands received from recorder CPU 44 to position a selected filter color between the displayed image and the section of film 42 upon which the image is to be recorded.

It will thus become apparent that although a single intensity on-off type of monochrome image is displayed upon the face 54 of CRT 40, the color and brightness of the image which is actually recorded upon film section 42 may be controlled by varying the color of the filter section 58 through which the image is viewed by the film 42 and by controlling the time or number of frames (repetitions) for which the image is projected upon the section of film 42.

An electronic switching circuit 64 receives the R, G, B, and I video data signals from video generator 34 and responds to blanking and switching control signals for recorder CPU 44 to selectively present received data signals to the intensity control circuitry of CRT 40 over a data line 66. The selective blanking of the electronic switching circuit 64 controls the time duration or number of display frames during which portions of a composite image are displayed upon face 54 of CRT 40 in contrast to the mechanical shutter 50 which is open at the beginning of an image recording interval and closed at the end of the interval when the complete composite image has been recorded. Because the chamber existing between the face 54 of CRT 40 and the film section 42 is maintained dark and light tight, blanking of the display on CRT 40 is sufficient to prevent further exposure of the film section 42 during intervals in which a given portion of a displayed image has been displayed for the desired time and a next portion is being assembled in the display buffer 32 for outputting by video generator 34 to the image recorder 12. Switching circuit 64 responds to a switching signal from recorder CPU 44 to select the particular video data signal or combination thereof which is to be communicated over signal path 66 to the intensity control of CRT 40. As noted previously and for the present example, signal paths R, G and B contain identical parallel data in the screen 2 mode of display monitor adapter 28 and signal G (green) has been arbitrarily selected for connection by switching circuit 64 to the display path 66.

Image recorder 12 also includes a delay circuit 68 which receives the vertical sync signal H-sync and selectively delays the vertical sync signal by one-half of a horizontal line time in response to a field seleot delay oontrol signal received from recorder CPU 44 over a delay signal path 70. Alternatively, the horizontal sync signal H-sync could be selectively delayed with the video data being correspondingly delayed to maintain normal synchronization between the horizontal sync signal and the video data. Delay circuit 68 operates to control vertical interlacing of first and second recorder fields which are provided for each primary color of a recorded image. The first field is recorded with no delay while the vertical sync signals for each line of a second field are delayed by one-half line time to move the raster scan lines of the second field upward on the face 54 of CRT 40 by one-half of a line-to-line spacing distance and thus provide vertical interlacing of the first and second fields of the video images for each color. The 200 line vertical resolution provided by display monitor adapter 28 is thus doubled to 400 lines by using the time sequential recording capabilities of the film section 42 without exceeding the capabilities of a standard monitor adapter 28. It will be appreciated that using similar techniques, the spatial resolution could be further increased in the vertical direction and could be increased in the horizontal direction if desired.

Figure 2:
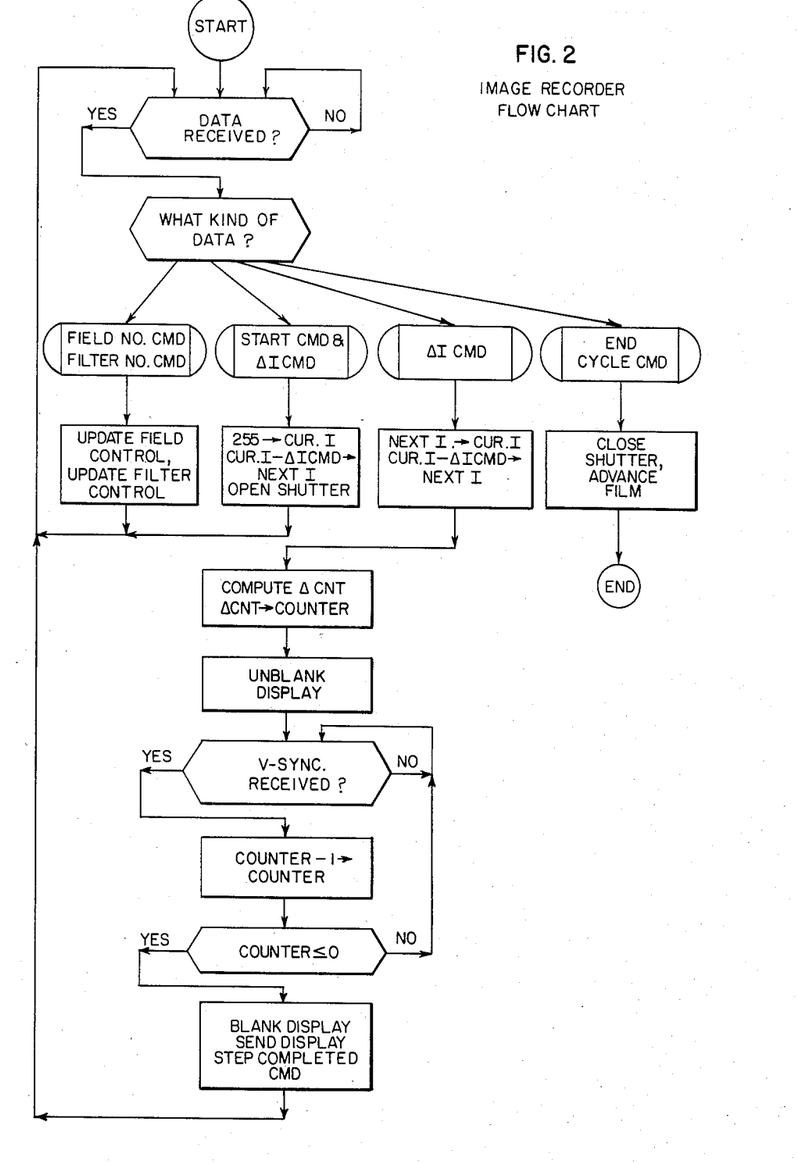
FIG. 2 is an operational flow chart for a photographic image recorder portion of the image recording system shown in FIG. 1.

A functional flow chart for image recorder 12 is shown in FIG. 2 to which reference is now made. In a standby or idle mode, recorder 12 awaits the receipt of data from CPU 18 over system bus 16 and RS 232 asynchronous communication adapter 26. Upon the receipt of data, the recorder 12 tests the received data to determine the particular kind of data which has been received. If the data is a field number command and a filter number command, the CPU 44 responds by generating a delay command signal which is communicated to delay circuit 68 to command the appropriate zero or one-half line delay for field one or field two respectively, whichever is to apply to the next displayed video image. Similarly, a filter command is generated by CPU 44 and communicated to filter position control 62 to cause the interposition of the appropriately colored filter section 58 between the displayed image and the section of recording film 42. After updating the field control and filter control status, the image recorder 12 returns to the standby mode.

Under normal circumstances the next data to be received would be a start command and a first delta intensity command. Image recorder 12 responds to this set of commands by loading count number 255 into a current intensity register, subtracting the magnitude of the first delta increment command from the value stored by the current intensity register (255), and loading the difference into a next increment register. If the mechanical shutter 50 has not already been opened, an open command is sent on communication path 52 to command the opening of shutter 50.

While the recording system 10 is capable of recording computer generated images with a dynamic resolution of one part in 1,024 or more per color, it has been found adequate in the present system to define dynamic color intensity resolution with a single byte which provides a color intensity range of 0–255 with zero representing black and 255 representing maximum brightness for a given color. The first delta intensity command which is received by image recorder 12 following a start command represents the difference between the 255 maximum color intensity and the brightest intensity for the given color which is actually found within an image to be recorded. Consequently, if the computer generated image includes a maximum intensity portion for the color under consideration, the first delta intensity command following a start command would be zero and a magnitude of 255 would be loaded into both the current intensity register and the next intensity register. The image recorder then returns to the idled condition to await receipt of the next set of data.

The next data to be received would typically be a next delta intensity command defining the change in intensity for the current color component between the brightest intensity in the computer generated image and the second brightest intensity in the computer generated image. The CPU 44 of image recorder 12 responds to the second and subsequent delta intensity commands following a start command by transferring the contents of the next intensity register into the current intensity register and then writing the difference between the updated current intensity register and the newly received delta intensity command into the next intensity register.

The CPU 44 then utilizes the updated current intensity and next intensity values to compute a gamma compensated delta count parameter which is stored in a counter. While the various storage registers and counters have not been explicitly shown, it will be appreciated that they are part of CPU 44. For example, they might be implemented as separate counters or registers, but would more typically be implemented as selected ones of the several temporary storage registers that are commonly provided as part of a single chip microprocessor.

In any event, the delta count parameter represents a number of frames or step image scans (or alternatively a period of time during which a number of frames will be displayed at a 60 frame per second rate) for which the section 42 of photographic film is to be exposed for a particular portion of the computer generated image. It is derived from the stored current intensity and next intensity signals and incorporates compensation for the light sensitivity and nonlinearities in the light sensitivity of the particular kind of film upon which the computer generated image is being recorded. The delta count signal also is compensated in accordance with the brightness of the image displayed upon face 54 of CRT 40 and the optical transmitting characteristics of the filter section 58, lens 53, and shutter mechanism 50.

A typical kind of color photographic film becomes less sensitive to additional increments of light as the brightness of an exposed image increases in intensity. For example, exposure of the film 42 to a step image for a single frame time or scan will cause a certain incremental increase in the recorded color intensity. To obtain the same incremental increase in color intensity after the film has been exposed to 200 frames or step image scans of the step image may, for example, require exposure to the image for an additional 5 frames. The compensation utilized in computing the delta count parameter takes into account these particular nonlinear characteristics of the film so that a linear intensity signal between 0 and 255 as generated by the CPU 18 will correspond to a similar range of linear color intensities as actually seen by a person viewing an image recorded upon the film 42. In general, the required compensation will vary with the particular kind of film, with the different primary colors to which a given kind of film is exposed and with the optical transmitting characteristics of the particular CRT display and camera system.

Although alternate techniques for gamma compensation such as look-up tables stored in a read only memory may be utilized, it is preferred that the compensation be implemented by utilizing for each color and for each different kind of color film, a set of piecewise linear equations which relate a computer generated intensity value to a given film exposure time or corresponding number of frame times. It has been found adequate to use a set of six equations per color, with each equation approximating a segment of the curve defining the relationship between a computer commanded intensity level and the corresponding required number of display frames. The exact shape of the compensation curves are dependent upon the particular type of film and camera characteristics which are employed, and are not deemed to be part of the inventive subject matter of this application. Suitable curves can be readily derived by persons skilled in the art for a particular kind of film and a particular set of camera optical characteristics. Further details on gamma compensation may be had by reference to commonly assigned application Ser. No. 333,120 filed Dec. 21, 1981 by John K. Cool for "System And Apparatus For Conversion Of Video Signals To Film Images," now U.S. Pat. No. 4,473,849.

The delta count signal is thus obtained by utilizing the current intensity parameter to access the compensation equations to obtain a corresponding current count value and using the next intensity parameter to access the equations to obtain a next count value. The difference between the current count value and the next count value is then stored in the counter.

Next, the switching circuit 64 is commanded to unblank the display and the film section 42 is exposed to the display. Each time a vertical sync pulse is received, the count parameter within the counter is decremented until it reaches a value of zero as the film 42 is exposed to the displayed partial image (step image) for a number of counts equal to the initial delta count parameter. After the film 42 has been exposed to the indicated number of image frames, the switching circuit 64 is commanded to blank the CRT display and a display step completed command is communicated through the asynchronous communication adapter 26 and system data bus 16 to CPU 18. This informs the CPU 18 that it may proceed with the next display step by writing the next brightest portion of the partial image into buffer memory 32 and sending a new delta intensity command defining the change in intensity between the second and third most intense portions of the computer generated image for the current color. The image recorder 12 then proceeds to update the current and next intensity registers and the delta count counter and display the next step of the video image for a gamma compensated number of frame times as described above.

This mode of operation continues until the complete image for field one of the first color (red) has been exposed in a number of color intensity dependent steps. It will thus be appreciated that by first writing the brightest portion of the image into buffer 32 and exposing that image throughout all of the subsequent sequential exposure steps, the brightest portion of the image will expose the photographic film 42 for the greatest number of frame times. During subsequent steps display data defining less and less bright portions of the color image are stored in buffer 32 with the corresponding partial image being displayed on the face 54 of CRT 40 so that the film 42 is exposed to image portions representing these color images for fewer and fewer numbers of frames. The result is that for each field of each color the film 42 is exposed for a range of scan times corresponding to a range of brightnesses which can define in the present example 255 different values of recorded color intensity for each primary color.

Upon completing the exposure steps for the first frame of the first color, the CPU 18 will command an updating of the field control command to cause delay circuit 68 to be commanded to provide a one-half horizontal scan line delay of the horizontal sync signal, H-sync. The CPU 18 then sends a start command and the first delta intensity command to indicate the beginning of a sequence of steps for a new field. The image for field two color one (red) is then recorded in a sequence of steps similar to those used for field one until all of the steps have been completed. The recording system then continues in a similar manner for field one of color two (green), field two of color two (green), field one of color three (blue), and finally field two of color three (blue).

After all of the film exposure steps have been completed for fields one and two for each of the three primary colors (six fields) the CPU 18 sends the CPU 44 an end of cycle command which causes CPU 44 to generate a close shutter command which causes shutter 50 to be closed and an advance film command which causes the film support and advance mechanism 46 to advance the film to a next film image section 42 in preparation for the recording of a next computer generated image.

Figure 3:
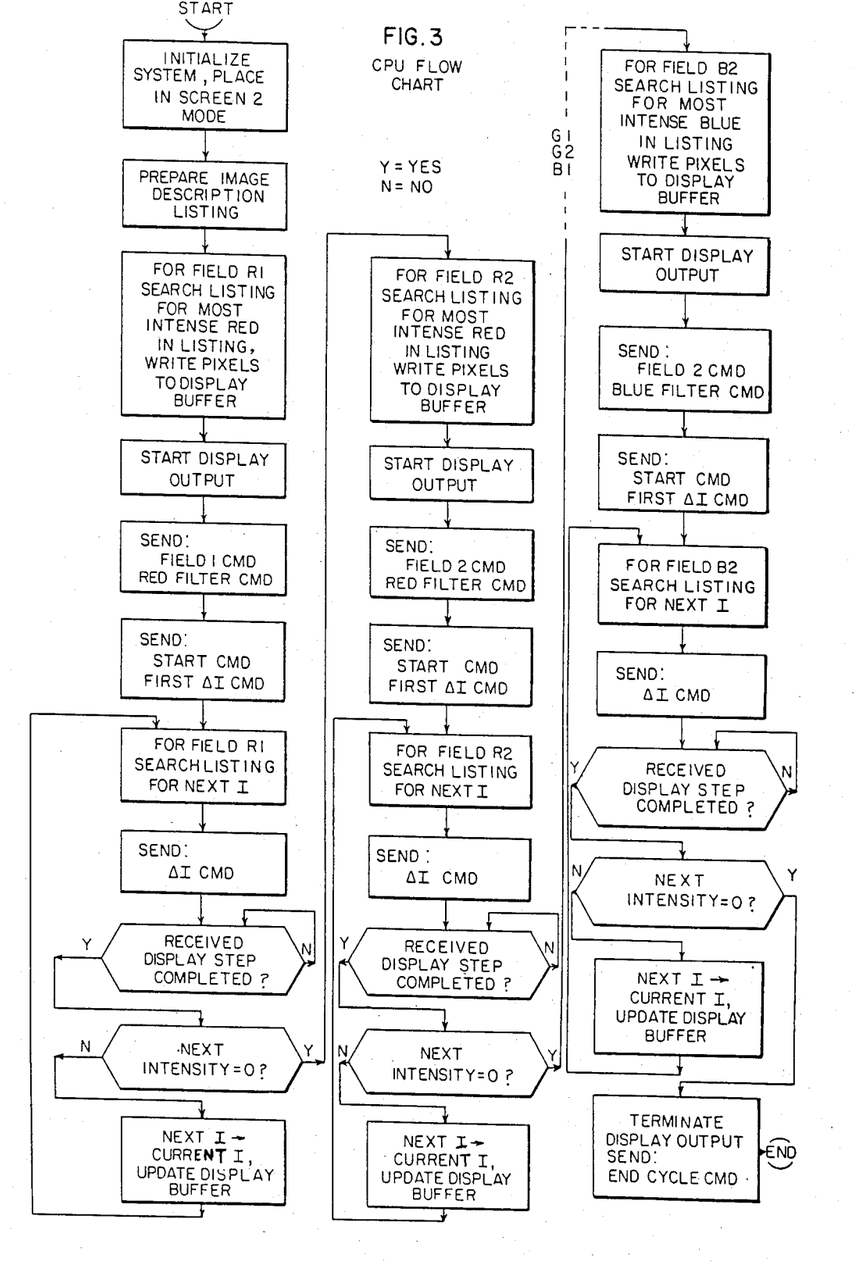
FIG. 3 is an operational flow chart for a data processor portion of the system shown in FIG. 1.

An operational flow chart for the CPU 18 is shown in FIG. 3, to which reference is now made. Operation for the generation, display and recording of a computer generated image begins with initialization of the system, placement of the system in the screen 2 in the case of the IBM personal computer and then preparation of the image description listing. As an example, it will be assumed that the image to be recorded is the simple bar graph display illustrated as it might appear after recording on a section of film 42 in FIG. 4 to which further reference is now made. For example, the listing for the bar graph of FIG. 4 might be as shown in Table I. Each of the five bars 81-85 is described as a box followed by the horizontal and vertical coordinates for the upper lefthand corner in parenthesis, the horizontal and vertical coordinates for the lower righthand corner in parenthesis, followed by the red color intensity, green color intensity and then the blue color intensity. The shape, location, size and color of each of the bars is thus fully described by the listing of Table I. Additional shapes such as circles, triangles and even character strings could be included in a more complicated example but are excluded from the present example for reasons of simplicity.

TABLE I

Figure 4:
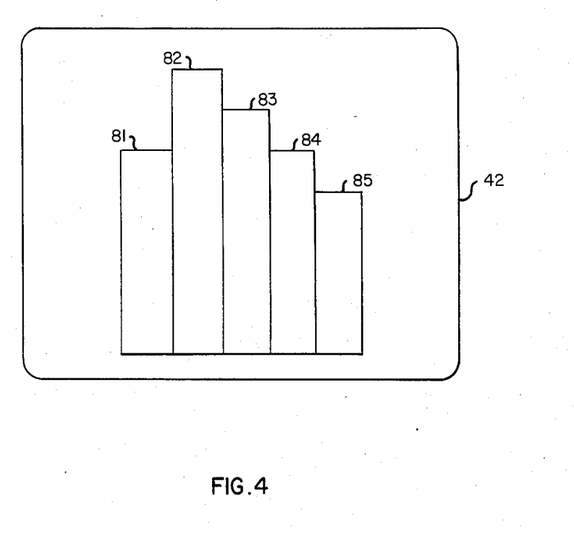
FIG. 4 is a graphical representation of an exemplary image that might be produced and photographically recorded by the image recording system shown in FIG. 1.

| Box | (200, 125) | (274, 375) | 255, 0, 0 |
|---|---|---|---|
| Box | (275, 25) | (349, 375) | 0, 200, 0 |
| Box | (350, 75) | (424, 375) | 0, 0, 225 |
| Box | (425, 125) | (499, 375) | 75, 50, 25 |
| Box | (500, 175) | (574, 375) | 0, 95, 150 |

After preparing the image listing the CPU 18 searches for field R1, that is field one of color red, for the most intensive red in the listing. This is accomplished by setting a counter to the maximum count of 255, searching for 255, then decrementing to 254 and searching for 254, then decrementing to 253 and searching for 253 and so forth. In the present example a listing is found in Table I for the lefthand most bar 81 for the maximum red color intensity of 255. Having found the listing, the corresponding box which represents the bar 81 is written into the display data buffer 32 with a logic 1 written into every bit position therein that corresponds to a pixel within the first bar 81. Only the horizontal scan lines corresponding to the first or even field are written. That is in the present example CRT 54 lines 126, 128, 130 ... 374 are written between horizontal dot positions 200 and 274 inclusive.

After the data corresponding to the first bar is written into buffer 32 the display monitor adapter 28 is commanded to begin outputting the stored display data at its frame rate of 60 frames or step image scans per second. At this point the image corresponding to the display data is not yet reaching the film 42 for the purpose of recording.

Next, a command is sent to the image recorder 12 to set the delay circuit 68 for field one and place the red filter between the face 54 of CRT 40 and the film 42. Next, a start command and the first delta intensity command is sent by CPU 18 to the CPU 44. In this case the first color image to display is of a maximum intensity so that the first delta intensity command is zero.

The CPU 18 now searches again the listing of Table I for the next red color intensity value. As the color intensity counter counts down to a count of 75 a match will be found at the fourth bar graph. The CPU subtracts this next intensity value of 75 from the current intensity value of 255 to send a delta intensity command of 180 to the CPU 44. The CPU calculates the number of frames or step image scans corresponding to intensity 255, calculates the number of frames or step image scans corresponding to intensity 75, and then stores the delta count corresponding to the difference in these two frame values in the frame counter. For example, this delta frame count value might be 520. In this event the value 520 is stored in the frame counter and the frame counter is decremented for 520 frame display times or step image scans in response to the vertical synchronization signal until the count reaches a value of zero. At this time the switching circuit is commanded to again blank the display and a step completed command is sent to the CPU 18.

Upon receipt of the step completed command by the CPU 18 a test is made of the next intensity register contents for value zero. In the present example the next intensity value is 75 and this value is used to replace the contents of the current intensity register with the new current intensity value being used to update the buffer store 32 by writing all image data having this color intensity value into buffer 32. In this case the fourth bar 84 of the bar graph is added to the first bar data so that the stored data of buffer 32 now defines as a 1 bit monochrome image the first and fourth bars 81, 84 of the bar graph. As shown by the flow chart of FIG. 3, operation now returns to the step of searching field one of color red listing for the next color intensity. In this case a match would be found at intensity zero, but in any event the intensity counter is not permitted to decrement below zero. Having found the next color intensity or having reached a value of zero, operation proceeds by sending the next delta intensity command to CPU 44. In this case the difference between the value of 75 now stored in the updated intensity register and the value of zero found for the next intensity register is 75 and a delta intensity command of 75 is sent to the CPU 44.

The CPU 44 responds to this data by calculating the intensity end points of 75 and 0 and then determining from these values and the stored compensation equations what count corresponds thereto, for example a count of 80 might be utilized in the present instance. CPU 44 then loads a value of 80 into the frame counter, enables the unblanking of the display and permits the film section 42 to be exposed to 80 frames or step image scans of the current display image which comprises the first and fourth bars 81 and 84. As the frame counter reaches a count of zero the display is again blanked and a step completed command is returned to CPU 18. At this point the first bar of the composite image has been exposed on the film section 42 for 600 frames while the fourth bar has been exposed for only 80 frames and all of these exposures have been through the red filter.

Upon receiving the display step completed command, CPU 44 again tests the next intensity register contents for zero and finds a positive comparison. This causes operation to proceed to the next column as shown in FIG. 3 wherein operation is substantially the same as the corresponding part of the first column except that a field two command is sent to the CPU 44 instead of a field one command and the display image data stored in the buffer memory 32 and communicated to the image recorder 12 corresponds to the odd numbered lines 1, 3, 5 ... 399. Upon testing for the value of the contents of the next intensity register and finding it to be zero, the operation then proceeds to the first field of the color green, designated G1, and then continues in sequence to the second field for color green, designated G2, the first field for color blue, designated B1, and finally the second field for color blue, designated B2.

Upon testing the next intensity register value for zero while in the second field of color blue mode, and finding a value of zero, the operation proceeds to a terminate step which involves termination of the display output by display monitor adapter 28 and the sending of an end cycle command to CPU 44. This completes the display operation.

It should be appreciated that it is not critical that the image recorder 12 contain the processing power of CPU 44. In an alternative arrangement the data processing performed by the CPU 44 such as the gamma compensation calculations and the frame counting could be performed by the main processor CPU 18. The image recorder could then be a relatively dumb terminal receiving elemental commands to control the video blanking and switching, the mechanical shutter 50, the film support and advance mechanism 46 and the filter position control 62. The CRT 40 could even be controlled for frame selection externally of the image recorder 12.

While a particular arrangement of a display and recording system 10 in accordance with the invention has been shown and described herein for the purpose of enabling a person of ordinary skill in the art to make and use the invention, it will be appreciated that the invention is not limited thereto. Accordingly, any modifications, variations or equivalent arrangements within the scope of the attached claims should be considered to be within the scope of the invention.

What is claimed is:

1. A high resolution color image recording system for computer generated displays comprising:
    a data processor storing at least one video image and including a display monitor adapter having a limited size display buffer and generating as an output a video signal representative of a video image stored in the display buffer, the data processor sequentially storing in the display buffer a plurality of step images which each partially represent an image that is to be recorded by representing portions of the image to be recorded which have an intensity in a selected one of a plurality of different intensity ranges for each one of a plurality of different color components of the image that is to be recorded and with the step images corresponding to different ones of a plurality of spatially mutually exclusive fields forming the image, the data processor being further operable to generate command signals indicative of the color, the field and intensity range of a step image stored in the display buffer; and
    an image recorder coupled to receive the command signals and the video signal and including a display device displaying a step image represented by the received video signal upon a recording medium at a spatial position on the medium corresponding to the particular field being displayed for an amount of time determined in response to the intensity range command signal and with a color component determined in response to the color command signal.

2. The color image recording system according to claim 1 above, wherein the recording medium is photographic color film.

3. The color image recording system according to claim 1 above, wherein each step image has a spatial resolution of 640 pixels by 200 pixels and corresponds to one of two interlaced fields of an image recorded on the recording media.

4. The color image recording system according to claim 1 above, wherein the image recoreder stores intensity compensation information relating each color intensity level to a selected medium exposure time in accordance with imaging characteristics of the image recorder including illumination characteristics of the display device and illumination sensitivity of the recording medium and wherein the image recorder is operable during each step of exposing a displayed image to expose the recording medium for a length of time indicated by the compensation information.

5. the color image recording system according to claim 4 above, wherein the data processor is operable for each step of each displayed image to generate an indication of the color intensity magnitude for the next step and the image recorder is operable to access the compensation information for a current intensity magnitude to obtain a current exposure time, to access the compensation information for a next intensity magnitude to obtain a next exposure time, to expose the recording medium for a period of time equal to the difference between the current and next exposure times and upon receipt of another color intensity magnitude for the next step, substitute the existing next step exposure time information for the current step exposure information.

6. The color image recording system according to claim 1 above, wherein for each step image the data processor determines and sends to the image recorder an indication of a change in color intensity between the present step image and a next step image and the image recorder responds to the indicaiton of a change by exposing the recording medium to the displayed image for the current step for a time period dependent upon the indication.

7. The color image recording system according to claim 6 above, wherein the image recorder stores a set of piecewise linear equations providing total exposure times corresponding to color intensities and is operable to determine an exposure time for a current step in accordance with a change in total exposure times received from the set of equations in response to indicated current step and next step color image intensities.

8. A high resolution image recording system comprising:
    a data processor including a data bus, a main store coupled to the data bus and a display monitor adapter coupled to the data bus, the display monitor adapter including mode control registers coupled to receive data from the data bus for controlling the mode of operation of the display monitor adapter, a limited capacity display buffer which communicates video data over the data bus, and a video generator coupled to receive video data from the display buffer and repetitively output as a step image said video data in display order under control of the mode control registers, the video generator generating horizontal and vertical synchronization signals having an unchanging predetermined relationship to each repetition of the step image, the data processor being operable to store in the display buffer video data representing a step image corresponding to a selected one of a plurality of different types of fields with each type representing a different spatially mutually exclusive portion of a video image and provide a field command indicating which type of field corresponds to a step image stored in the display buffer, video data representing step images corresponding to each of the different kinds of fields of the video image being sequentially stored in the buffer and output by the video generator, the data precessor being operable to sequentially generate and store in the display buffer video data representing a step image for each of a plurality of spatially mutually exclusive types of image fields for each of a plurality of different colors and to generate a filter command signal that is indicative of a color to which a step image pertains; and
    an image recorder coupled to receive the video data, the horizontal and vertical synchronization signals and the field command and to record display data representing a step image for each type of field at a spatial position corresponding to the indicated field type, the image recording system being operable to sequentially generate and record a sequence of a plurality of different step images which each correspond to a different type of field to generate a high resolution composite recording of the video image including a step image corresponding to each of the plurality of different types of fields, the image recorder including a filter system having a filter for each of said plurality of different colors and a filter position control responsive to the filter command signal and connected to interpose a filter corresponding to an indicated color between the generated and recorded image for each generated display of a step image.

9. The high resolution image recording system according to claim 8 above, wherein the data processor is operable to sequentially generate and store in the display buffer video data representing a plurality different step images for each field in a plurality of brightness dependent steps and for each step to generate an intensity signal indicative of a brightness to which the step pertains and a change in brightness relative to a next step and wherein the image recorder includes a recorder processing unit coupled to receive the intensity signal and for each step expose a recording medium to a generated step image for a number of repetitions dependent upon the indicated change in brightness relative to a next step.

10. A high resolution image recording system comprising:
a data processor including a data bus, a main store coupled to the data bus and a display monitor adapter coupled to the data bus, the display monitor adapter including mode control registers coupled to receive data from the data bus for controlling the mode of operation of the display monitor adapter, a limited capacity display buffer which communicates video data over the data bus, and a video generator coupled to receive video data from the display buffer and repetitively output as a step image said video data in display order under control of the mode control registers, the video generator generating horizontal and vertical synchronization signals having an unchanging predetermined relationship to each repetition of the step image, the data processor being operable to store in the display buffer video data representing a step image corresponding to a selected one of a plurality of different types of fields with each type representing a different spatially mutually exclusive portion of a video image and provide a field command indicating which type of field corresponds to a step image stored in the display buffer, video data representing step images corresponding to each of the different kinds of fields of the video image being sequentially stored in the buffer and output by the video generator, the data processor sequentially generating and storing in the display buffer video data representing a plurality of different step image for each field in a plurality of brightness dependent steps and for each step generating an intensity signal indicative of a brightness to which the step pertains and a change in brightness relative to a next step; and
an image recorder coupled to receive the video data, the horizontal and vertical synchronization signals and the field command and to record display data representing a step image for each type of field at a spatial position corresponding to the indicated field type, the image recording system being operable to sequentially generate and record a sequence of a plurality of different step images which each correspond to a different type of field to generate a high resolution composite recording of the video image including a step image corresponding to each of the plurality of different types of fields, the image recorder including a recorder processing unit coupled to received the intensity signal and for each step expose a recording medium to a generated step image for a number of repetitions dependent upon the indicated change in brightness relative to a next step.

11. A high resolution image recording system comprising:
a data processor including a data bus, a main store coupled to the data bus and a display monitor adapter coupled to the data bus, the display monitor adapter including mode control registers coupled to receive data from the data bus for controlling the mode of operation of the display monitor adapter, a limited capacity display buffer which communicates video data over the data bus, and a video generator coupled to receive video data from the display buffer and repetitively output as a two level monochrome step image said video data in dsiplay order under control of the mode control registers, the video generator generating horizontal and vertical synchronization signals having an unchanging predetermined relationship to each repetition of the step image, the data processor being operable to store in the display buffer video data representing a step image corresponding to a selected one of a plurality of different types of fields with each type representing a different spatially mutually exclusive portion of a video image and provide a field command indicating which type of field corresponds to a step image stored in the display buffer, video data representing step images corresponding to each of the different kinds of fields of the video image being sequentially stored in the buffer and output by the video generator;
an image recorder coupled to receive the video data, the horizontal and vertical synchronization signals and the field command and to record display data representing a step image for each type of field at a spatial position corresponding to the indicated field type, the image recording system being operable to sequentially generate and record a sequence of a plurality of different step image which correspond to a different type of field to generate a high resolution composite recording of the video image including a step image corresponding to each of the plurality of different types of fields; and
a photographic film disposed to be exposed by and record a selected number of repetitions of a generated step image.

12. A high resolution image recording system comprising:
means for generating display data defining a step image for each of three different color components of an image to be recorded and for each of a plurality of different spatially mutually exclusive fields for each color component;
means coupled to receive the display data for displaying an image defined thereby with the color component to which the displayed image corresponds; and
means for recording disposed to be exposed to be exposed by the displayed image for a selected number of repetitions of the displayed image.

13. The high resolution image recording system according to claim 12 above, wherein the generating means includes means for generating each step image as one of a plurality of color intensity dependent steps during each of which the generated display data defines a step image corresponding to a particular color intensity within the image for the color component to which the step image corresponds, and further comprising means for exposing the recording means for a color intensity dependent time during each step.

14. The method of recording an image upon a recording medium using a display having a resolution less than the resolution of the recorded image comprising the steps of:

storing an image to be recorded;

for a first color, scanning the stored image to assemble and output for a plurality of repetitions display data defining a step image corresponding to a first type of spatially distinct field, and in sequence scanning the stored image to assemble and output for a plurality of repetitions display data corresponding to at least a second type of spatially distinct field;

in sequence repeating for a second color the substeps executed for the first color;

in sequence repeating for a third color the substeps executed for the first color;

displaying in sequence to a recording to a recording medium the at least one consecutive repetition of each step image at a spatial location determined by a field to which the step image corresponds; and interposing between the display and the recording medium a filter of a color corresponding to a field of display data being displayed.

15. The method of recording an image according to claim 14 above, wherein each scanning substep includes a plurality of sequential sub-substeps with a set of color intensity dependent display data being assembled and output at each sub-substep and wherein the displaying step includes the substeps of displaying in sequence to a recording medium for a selected number of repetitions a step image defined by each set of color intensity dependent display data.

* * * * *